US011640395B2

(12) United States Patent
Zimmerman et al.

(10) Patent No.: US 11,640,395 B2
(45) Date of Patent: May 2, 2023

(54) QUERY COMPILER FOR RECORD FILTERING

(71) Applicant: Western Digital Technologies, Inc., San Jose, CA (US)

(72) Inventors: Israel Zimmerman, Ashdod (IL); Eyal Hakoun, Gesher Haziv (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 181 days.

(21) Appl. No.: 17/181,886

(22) Filed: Feb. 22, 2021

(65) Prior Publication Data

US 2022/0121661 A1    Apr. 21, 2022

Related U.S. Application Data

(60) Provisional application No. 63/094,714, filed on Oct. 21, 2020.

(51) Int. Cl.
| | |
|---|---|
| *G06F 16/242* | (2019.01) |
| *G06F 16/248* | (2019.01) |
| *G06F 16/22* | (2019.01) |
| *G06F 16/23* | (2019.01) |
| *G06F 16/2452* | (2019.01) |

(52) U.S. Cl.
CPC ...... *G06F 16/2445* (2019.01); *G06F 16/2282* (2019.01); *G06F 16/235* (2019.01); *G06F 16/248* (2019.01); *G06F 16/2452* (2019.01)

(58) Field of Classification Search
CPC ............ G06F 16/2445; G06F 16/2282; G06F 16/235; G06F 16/2452; G06F 16/248
See application file for complete search history.

(56) References Cited

U.S. PATENT DOCUMENTS

| | | | | |
|---|---|---|---|---|
| 9,116,858 | B1* | 8/2015 | Yokoi | H04L 67/1097 |
| 11,055,284 | B1* | 7/2021 | Vogelsgesang | G06F 16/2454 |
| 2008/0071818 | A1* | 3/2008 | Apanowicz | H03M 7/30 |
| 2015/0293794 | A1* | 10/2015 | Levin | G06F 9/505 |
| | | | | 718/104 |

* cited by examiner

*Primary Examiner* — Albert M Phillips, III
(74) *Attorney, Agent, or Firm* — Patterson + Sheridan, LLP; Steven H. VerSteeg

(57) ABSTRACT

A method and apparatus for carrying out a database select, or query, on a data storage device, upon data stored on that device. Data is received from a host and compressed on the data storage device using a compression code developed on the data storage device for the data. When the host issues a database select request on the compressed data, the compression code is distributed to processing cores of the data storage device and compiled, including the select request, into machine code. The machine code is used to decompress the compressed data while filtering the data with the select request. The filtering result is returned to the host.

16 Claims, 6 Drawing Sheets

QUERY COMPILER FOR RECORD FILTERING

CROSS-REFERENCE TO RELATED APPLICATIONS

This application claims benefit of U.S. provisional patent application Ser. No. 63/094,714, filed Oct. 21, 2020, which is herein incorporated by reference.

BACKGROUND OF THE DISCLOSURE

Field of the Disclosure

Embodiments of the present disclosure generally relate to a computational storage, and more specifically to carrying out database functions as native operations of a data storage device.

Description of the Related Art

Current compute/storage architectures store and process data in different architectural units. For example, a database is typically stored in a data storage device. In order to carry out operations on records of the database, the data is copied to host device memory where the operation (e.g., select, insert, update, delete) is performed on the data using host processor resources. When the operation is completed, the data storage device is updated with the updated state of the data (for insert, update, or delete), while the result of a select is returned to the host. Movement of data between host memory and data storage, performing operations in host memory, takes unnecessary time and power that could be used more efficiently.

What is needed are systems, devices, and methods to move at least the need to use host memory and processing resources of database operations to the memory and processors of data storage devices.

SUMMARY OF THE DISCLOSURE

The present disclosure generally relates to systems and methods for carrying out a database select, or query, on a data storage device, upon data stored on that device. Data is received from a host and compressed on the data storage device using a compression code developed on the data storage device for the data. When the host issues a database select request on the compressed data, the compression code is distributed to processing cores of the data storage device and compiled, including the select request, into machine code. The machine code is used to decompress the compressed data while filtering the data with the select request. The filtering result is returned to the host.

In one embodiment, a data storage device is disclosed, comprising one or more memory devices, a controller coupled to the one or more memory devices and configured to execute a method for querying data. In embodiments, the method includes receiving a database query from a host, receiving compressed data from the one or more memory devices, decompressing the compressed data, the decompressing comprising filtering data during decompression based on the database query, and returning a result of the filtering to the host.

In another embodiment, a solid state data storage device is disclosed, that includes a front-end module (FM) ASIC coupled to an NVM die configured to store data, and a front-end (FE) ASIC comprising a controller and a plurality of processors, the controller configured to perform a method for querying data. In embodiments the method includes receiving a query for data stored on the NVM die, and decompressing the data, comprising filtering the data during decompression based on the query.

In another embodiment, a device for storing data is disclosed that includes one or more memory means, and a controller means configured to perform a method for querying data. In embodiments the method includes receiving a database instruction from a host, receiving compressed data from the one or more memory means, and providing a result of the database instruction to the host.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

The present disclosure generally relates to systems and methods for carrying out a database select, or query, on a data storage device, upon data stored on that device. Data is received from a host and compressed on the data storage device using a compression code developed on the data storage device for the data. When the host issues a database select request on the compressed data, the compression code is distributed to processing cores of the data storage device and compiled, including the select request, into machine code. The machine code is used to decompress the compressed data while filtering the data with the select request. The filtering result is returned to the host.

Figure 1:
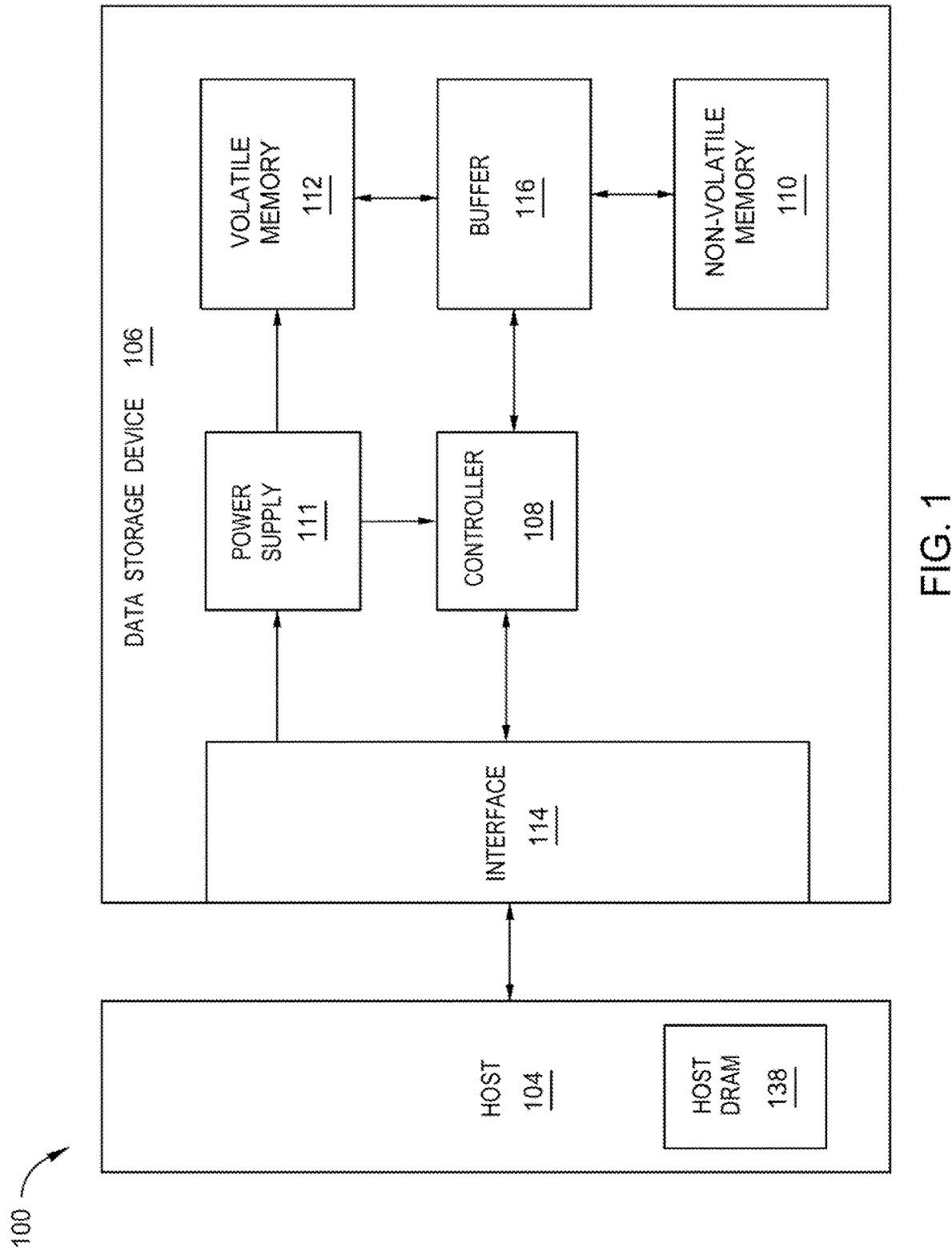
FIG. 1 is a schematic block diagram illustrating a storage system in which a data storage device may function as the data storage device for a host device, according to disclosed embodiments.

FIG. 1 is a schematic block diagram illustrating a storage system 100 in which data storage device 106 may function as a storage device for a host device 104, according to disclosed embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The storage system 100 includes a host device 104, which may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
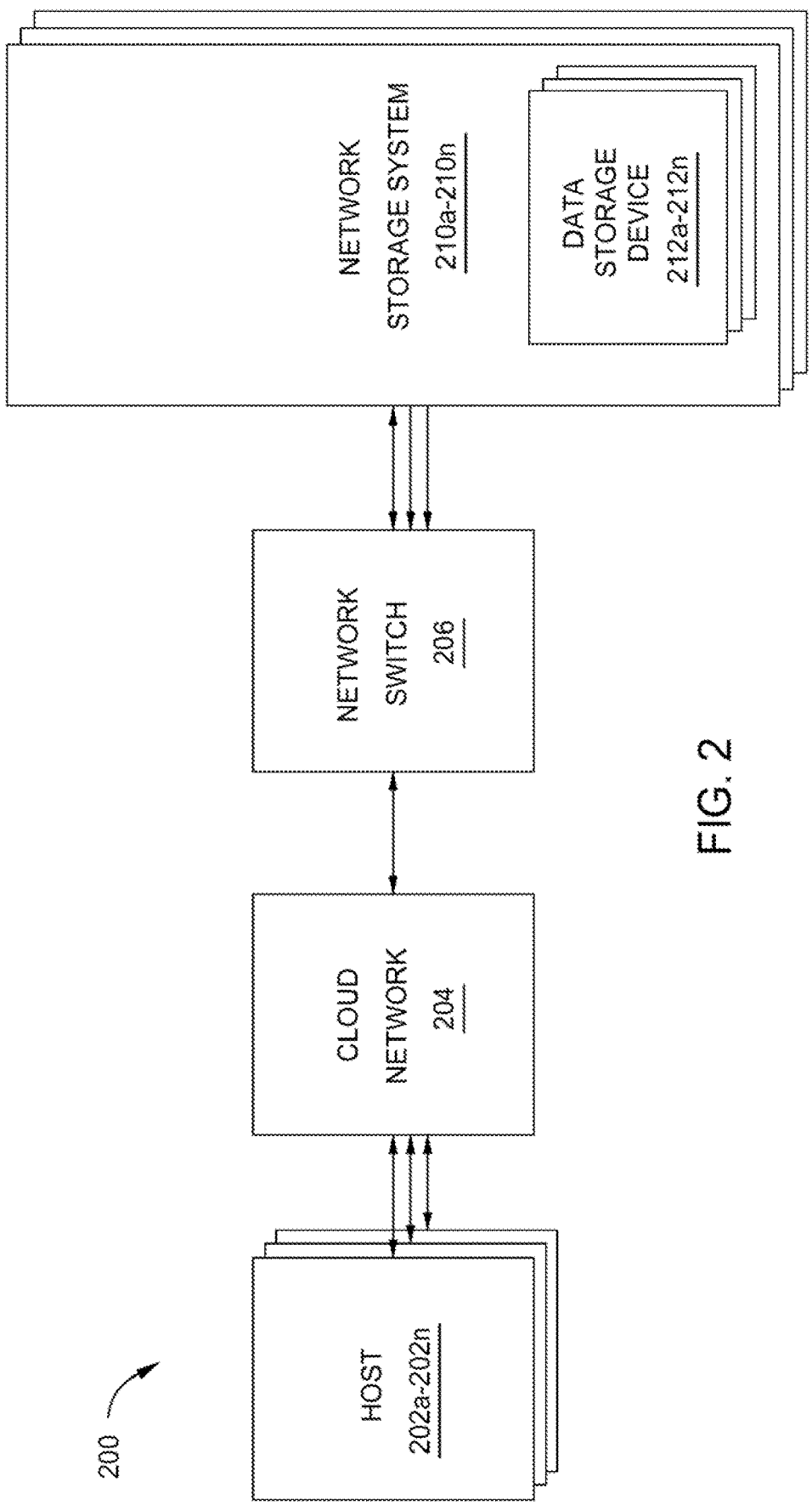
FIG. 2 is a schematic block diagram illustrating a database server system according to disclosed embodiments.

FIG. 2 is a schematic block diagram illustrating a database server system 200, according to disclosed embodiments. The database server system includes one or more host devices 202a-202n, where each of the one or more host devices 202a-202n may be the host device 104 of FIG. 1, a cloud network 204, a network switch 206, and one or more network storage systems 210a-210n. Each of the network storage systems 210a-210n includes one or more data storage devices 212a-212n, where each of the one or more data storage devices 212a-212n may be the data storage device 106 of FIG. 1 or 304 of FIG. 3, discussed below.

The one or more host devices 202a-202n may be connected to the cloud network 204 via methods of network data transfer, such as Ethernet, Wi-Fi, and the like. The cloud network 204 is connected to the network switch 206 via methods of network data transfer, such as Ethernet, Wi-Fi, and the like. The network switch 206 may parse the incoming and outgoing data to the relevant location. The network switch 206 is coupled to the one or more network storage systems 210a-210n. The data from the one or more host devices 202a-202n are stored in at least one of the one or more data storage devices 212a-212n of the one or more network storage devices 210a-210n.

For example, the one or more network storage systems may be configured to further parse incoming data to the respective one or more data storage devices 212a-212n as well as retrieve data stored at the respective one or more data storage devices 212a-212n to be sent to the one or more host devices 202a-202n. The one or more host devices 202a-202n may be configured to upload and/or download data via the cloud network 204, where the data is uploaded and/or stored to at least one of the one or more data storage devices 212a-212n of the one or more network storage systems 210a-210n. It is to be understood that "n" refers to a maximum number of described components of the database server system 200. For example, the one or more data storage devices 212a-212n may be about 1 data storage device, about 2 data storage devices, or any number greater than about 2 data storage devices.

Figure 3:
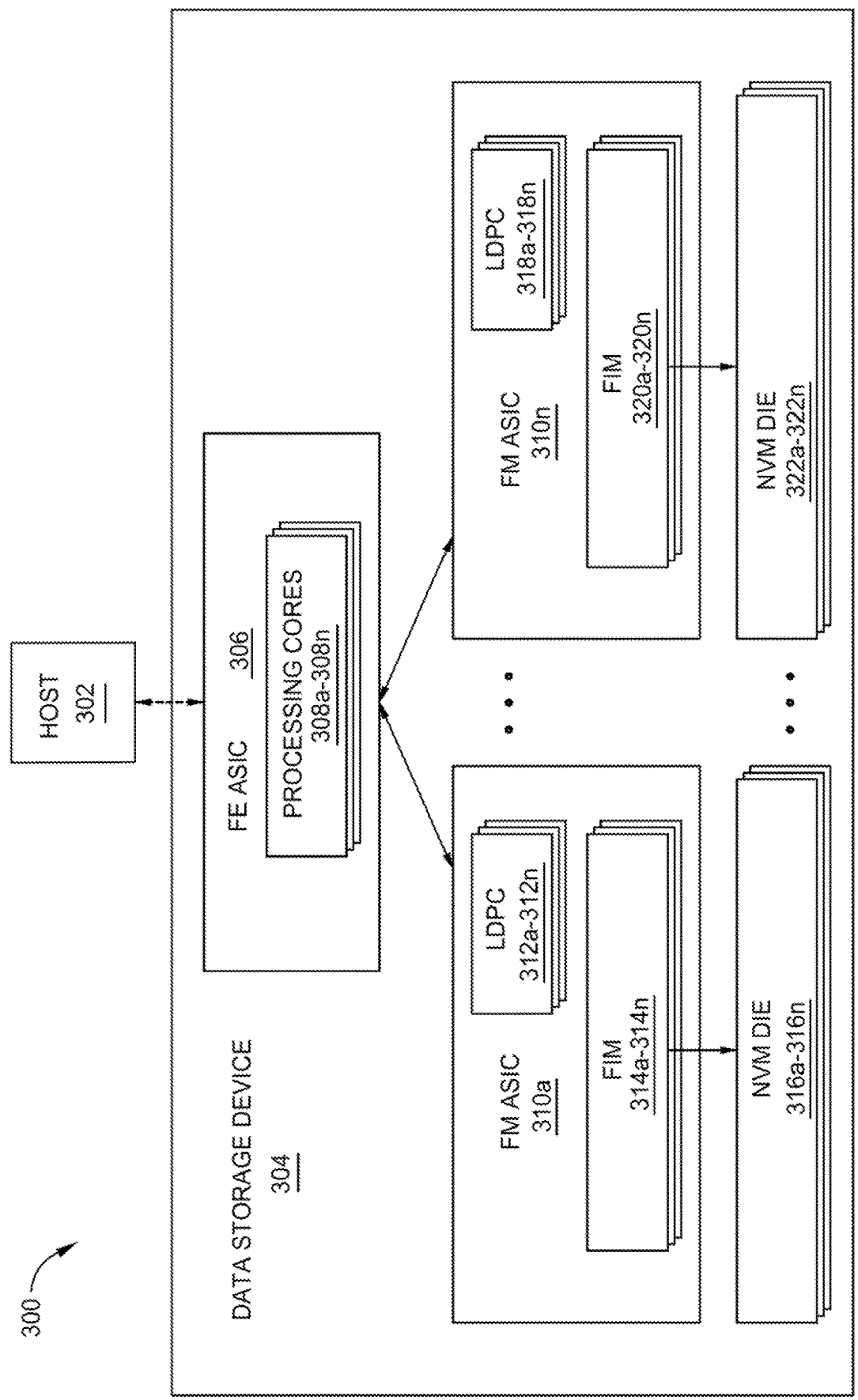
FIG. 3 is a schematic block diagram illustrating an improved data storage device, according to disclosed embodiments.

FIG. 3 is a schematic block diagram of a storage system 300 illustrating an improved data storage device 304, according to disclosed embodiments. The storage system 300 may be the database server system 200 of FIG. 1. For example, the data storage device 304 may be implemented as one or more data storage devices 212a-212n of the one or more network storage systems 210a-210n, and the host device 302 may be implemented as the one or more host devices 202a-202n of FIG. 2. It is to be understood that the data storage device 304 may include additional components not shown in FIG. 3 for the sake of clarity. In one embodiment, the data storage device 304 may be an E1.L enterprise and data SSD form factor (EDSFF).

The data storage device 304 includes a front-end (FE) application-specific integrated circuit (ASIC) 306, a first front-end module (FM) ASIC 310a, and an nth FM ASIC 310n. In the embodiments described herein, the "n" refers to a maximum number of described components of the data storage system 304. For example, the data storage device 304 may include about 10 FM ASICs, where the nth or "n" number of FM ASICs is equal to about 10. The data storage device 304 further includes one or more NVM dies 316a-316n, 322a-322n. Furthermore, the data storage device 304 may include a plurality of FM ASICs (indicated by the ellipses), where each of the FM ASICs of the plurality of FM ASICs is coupled to a respective NVM die of the plurality of NVM dies 316a-316n, 322a-322n. It is to be understood that while a plurality of FM ASICs and a plurality of NVM dies coupled to each of the FM ASICs of the plurality of FM ASICs are described, and the data storage device 304 may include a single FM ASIC coupled to a single NVM die or a single FM ASIC coupled to a plurality of NVM dies. In one embodiment, the NVM is NAND memory, where each of the plurality of NVM dies are NAND dies. In one embodiment, the plurality of NVM dies 316a-316n, 322a-322n of the data storage device 304 are bit cost scalable (BiCS) 6 NVM dies. The BiCS 6 NVM dies may have improved operating speeds, and lower power consumption than previous versions such as BiCS 5 NVM dies.

The plurality of FM ASICs 310a-310n each comprise a plurality of low-density parity-check (LDPC) engines 312a-312n, 318a-318n and a plurality of flash interface modules (FIMs) 314a-314n, 320a-320n. Each of the plurality of FIMs 314a-314n, 320a-320n are coupled to a respective NVM die of the plurality of NVM dies 316a-316n, 322a-322n. In one embodiment, each FIM is coupled to a respective NVM die. In another embodiment, each FIM is coupled to a respective about four NVM dies. The plurality of LDPC engines 312a-312n, 318a-318n, may be configured to generate LDPC codes or parity data. The LDPC codes and the parity data may be attached to the respective incoming data to be written to the respective NVM die of the plurality of NVM dies 316a-316n, 322a-322n. In one embodiment, the FM ASIC includes about 14 LDPC engines. In another embodiment, the FM ASIC includes less than about 54 LDPC engines.

The LDPC codes and the parity data may be utilized to find and fix erroneous bits from the read and write process to the plurality of NVM dies 316a-316n, 322a-322n. In one embodiment, a high failed bit count (FBC) corresponds to an error correction code (ECC) or parity data size of about 10.0%. In another embodiment, a low FBC corresponds to the ECC or parity data size of about 33.3%. When the ECC or parity data size is increased from about 10.0% to about 33.3%, the FBC decreases as the data includes more capability to find and fix failed or erroneous bits. In another embodiment, each NVM die of the plurality of NVM dies 316a-316n, 322a-322n includes between about 10.0% and about 33.3% of ECC or parity data associated with the respective stored data. Furthermore, each NVM die of the plurality of NVM dies 316a-316n, 322a-322n may have a bit error rate (BER) of about 0.2 or less than about 0.2. By including more ECC or parity data with the respective data stored in the NVM dies 316a-316n, 322a-322n, the BER may be decreased or improved, such that the BER has a value closer to about 0. The table below describes a power consumption and read performance improvement by increasing the amount of ECC or parity data to be stored on each NVM die of the plurality of NVM dies 316a-316n, 322a-322n.

TABLE 1

| | FBC High (ECC size ~= 10.0%) | FBC Low (ECC size ~= 33.3%) |
|---|---|---|
| Read Performance (GB/s) | 1.2 | 4.7 |
| Power Consumption (Watt) | 0.200 | 0.120 |
| NVM Die Per FM | 27 | 7 |
| Total Data Storage Device Capacity (TB) | 5.56 | 4.69 |
| Total Power Consumption (W) | 29.348 | 24.832 |

The listed values in Table 1 are not intended to be limiting, but to provide an example of a possible embodiment. Though the total data storage device capacity is lower when the ECC or parity data size is about 33.3% (i.e., FBC low) than when the ECC or parity data size is about 10.0% (i.e., FBC high), the read performance is increased from about 1.2 GB/s to about 4.8 GB/s, and the power consumption decreases from about 0.200 Watt (using about 10.0% parity size, or high BER engine) to about 0.120 Watt (using about 33.3% parity size, or low BER engine). Thus, the data storage device 304 may have improved power consumption and read performance when the ECC or parity data size is greater.

The FE ASIC 306 includes a plurality reduced instruction set computer (RISC) processing cores 308a-308n. In the description herein, the RISC processing cores 308a-308n may be referred to as processing cores 308a-308n, for exemplary purposes. Although RISC processing cores are described, in embodiments other types of processing cores may be utilized, such as CISC, or other processor architecture. For example, the FE ASIC 306 may include a number of processing cores greater than about 5 processing cores. In another embodiment, the number of processing cores is about 256 processing cores and about 512 processing cores. Each of the plurality of processing cores 308a-308n is configured to receive and execute a database instruction from the host 302. The database instruction may include one of a select, an update, and an insert instruction. The database instruction may further include a delete instruction in addition to the previously mentioned instructions. Furthermore, when receiving a database instruction from the host 302, the FE ASIC 306 may allocate an appropriate number of processing cores of the plurality of processing cores 308a-308n to complete the requested database instructions.

Figure 4:
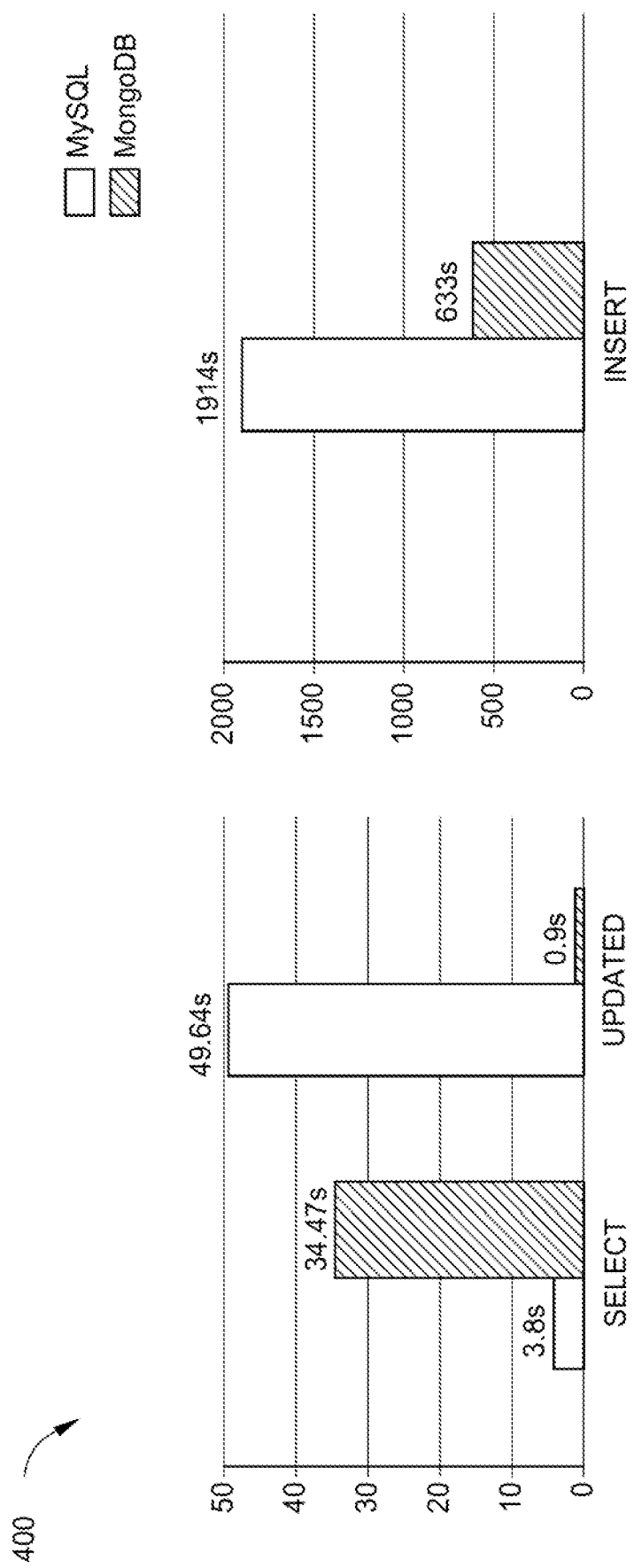
FIG. 4 illustrates the select, update, and insert timing of various databases, according to disclosed embodiments.

FIG. 4 illustrates the select, update, and insert timing of various databases, according to disclosed embodiments. The two databases shown in FIG. 4 are MySQL and MongoDB. The select command is used to retrieve one or more values (i.e., data), such as a row or a cell, from one or more tables of a database. The update command is used to update one or more values, such as a row or a cell, from one or more tables of the database, where the update command updates the relevant data retrieved from the select command. The insert command is used to insert one or more values, such as a row or a cell, to one or more tables of the database. It is to be understood that while select, update, and insert commands are exemplified, other database commands, such as a delete command, are relevant and relatable to the disclosed embodiments.

In the select timing, the MySQL has about a 3.8 second completion time, and the MongoDB has about a 34.47 second completion time. In the update timing, the MySQL has about a 49.64 second completion time, and the MongoDB has about a 0.9 second completion time. In the insert timing, the MySQL has about a 1,914 second completion time, and the MongoDB has about a 633 second completion time. The listed times are not intended to be limiting but to provide examples of possible embodiments. Generally, the MongoDB has a faster completion time than the MySQL database. Furthermore, when queries are coupled together, such as a select query and an update query, MongoDB has a faster completion time than that of MySQL.

Figure 5:
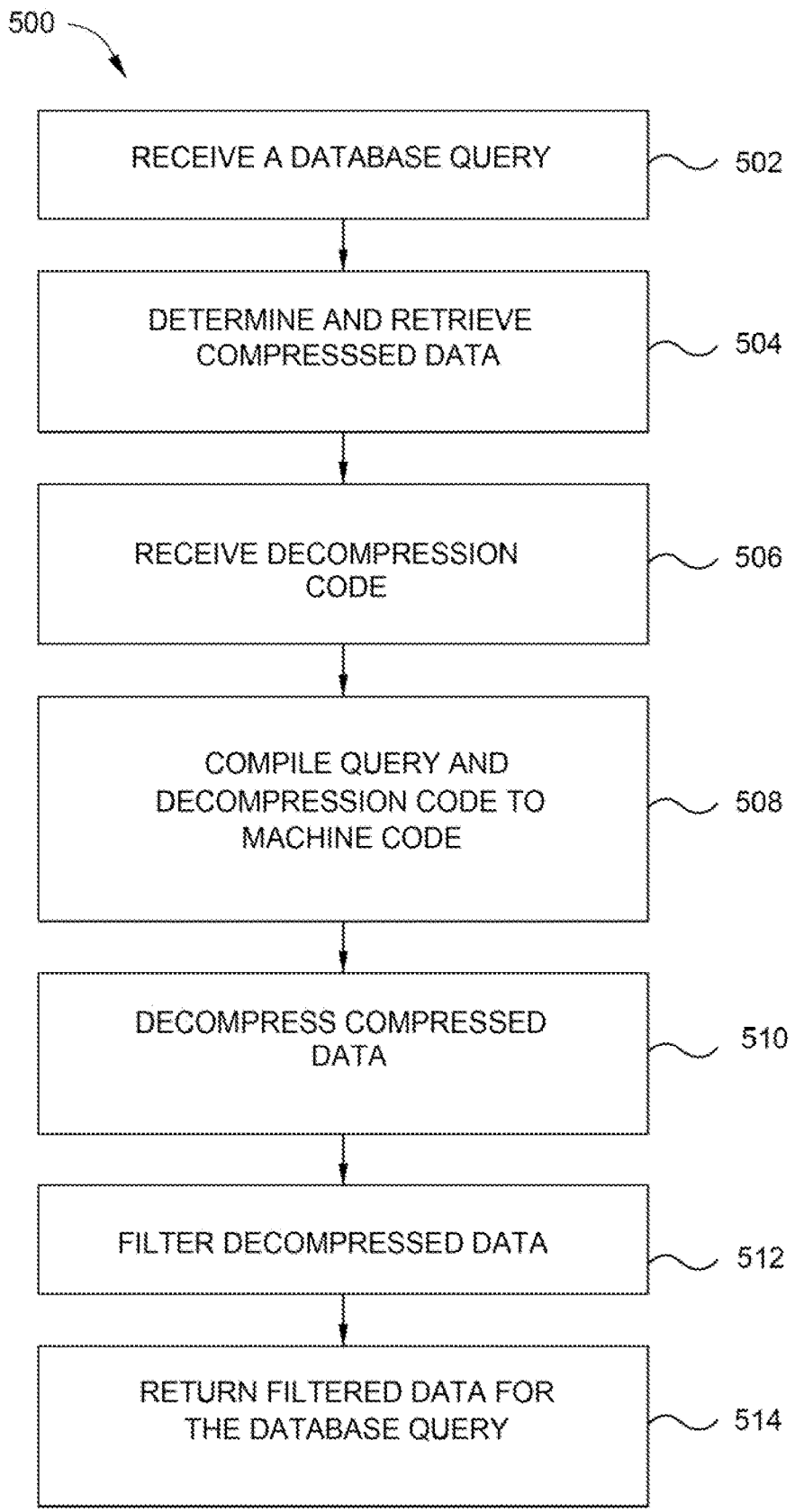
FIG. 5 illustrates a method of decompressing compressed data for a database query command, according to disclosed embodiments.

FIG. 5 illustrates a method 500 of decompressing compressed data for a database query command, according to disclosed embodiments. The plurality of processors, such as the plurality of processing cores 308a-308n of the FE ASIC 306 of FIG. 3, may be configured to compress the data received from the host, such as the host 302 of FIG. 3. The data may be received in a schema-less or a schema-full database type file. Aspects of the storage system 300 of FIG. 3 may be utilized as a reference when describing the method 500. Furthermore, the data may be compressed to binary records based on an internal data file structure (i.e., schema structure) or an external defined structure, such as a schema structure defined by the host and stored in a table according to the schema structure.

A schema-full database is a statically typed database where data is stored in specific columns according to the data type. An example of a schema-full database is MySQL. However, a schema-less database is a dynamically typed database, where the data type of the column may be editable or changeable. An example of a schema-less database is MongoDB. The schema-less database structure may allow for more flexibility to store a wider variety of data types, such as a document, than the schema-full database structure. In some embodiments, the schema-less database may be considered a not only SQL (NoSQL) database, where NoSQL refers to a database that stores document, key-value, wide-column, and graph. The data that is stored in the schema database may be stored as text, such as in a Google Protocol Buffer (referred to as a Protobuf, herein) schema format. A Protobuf is a method of serializing structured data. The method involves an interface description language that describes the structure of some data and a program that generates a text form the description of the structure that represents the structure data.

Each of the plurality of FM ASICs 310a-310n is configured to distribute and store the compressed data to the relevant NVM die of the one or more NVM dies 316a-316n, 322a-322n. At block 502, the controller, such as the controller 108 of FIG. 1, and/or the processors, such as the processing cores 308a-308n of FIG. 3, receives a database query command from the host, such as the host 302. The database query command may be a select, an update, an insert, or a delete command. In the embodiment described, the database query command may refer to a select command. At block 504, the controller and/or processors determines the location of the stored compressed data corresponding with the database query command, where the controller and/or processors may utilize a logical to physical (L2P) table or the like to determine the location of the relevant stored compressed data. Once determining the location of the relevant stored compressed data, the controller and/or processors are configured to retrieve the relevant compressed data.

At block 506, the controller and/or processors receive a decompression code from the host, FE ASIC, or another storage source storing the decompression code to decompress the compressed data. The decompression code and the database query command may both be compiled to machine code. Machine code is a numerical language, such as binary, used to control the processors to perform certain tasks, such as retrieving data from a location in the NVM or decompressing compressed data. For example, a query compiler may be a service of the host that converts "text query" to machine code to be executed by the plurality of processors of the data storage device.

The query compiler may prepare machine code for the decompression of data from a schema database, such as for decompressing Protobuf records and store the machine code in a relevant location in the data storage device, such as an internal cache or in the NVM. Upon receiving a database query request, such as an insert, a select, a delete, or an update request, the query compiler is configured to convert the request to machine code to be executed by the plurality of processors in parallel and send both the machine code for the decompression of data and the machine code for the database query request to the plurality of processors. The query compiler then prepares machine code for sorting, grouping, and other similar processes. The compiled query from the query compiler may be provided to a plurality of data storage devices, such as the data storage device 304 of FIG. 3.

Furthermore, at the plurality of processors level (i.e., at the FE ASIC), the plurality of processors are configured to decompress the record data, perform atomic steps, such as filter, calculations, and the like, distribute the machine code to all data storage devices on multiple connected platforms (i.e., storage systems), including each of the plurality of processors (i.e., processing cores), and perform enumerated type (Enum) conversions. At the individual processor level, the processor is configured to control the allocation of resources for each atomic step, gather outputs from the plurality of atomic steps, and perform processing of sorting, calculating of grouping, and the like.

At block 508, the query compiler compiles the received database query and decompression code to machine code. The resulting machine code is used to decompress the relevant compressed data at block 510. Furthermore, the machine code may be provided to multiple data storage devices, such that each of the one or more FE ASICs of the plurality of data storage devices and the plurality of FM ASICs of the FE ASICs may execute the machine code sequentially, independently, or in parallel with each other. At block 512, the decompressed data is filtered, such that the relevant data associated with the database query command may be extracted. Furthermore, the filtering may occur from multiple FIMs, such as the plurality of FIMs 31a-314n, 320a-320n of FIG. 3, of the same FM ASIC and in multiple FM ASICs, in parallel. In some embodiments, the actions at block 510 and block 512 may be executed in parallel on each of the plurality of processors. At block 514, the aggregated filtered data (i.e., one or more relevant data) associated with the database query command is returned to the host.

Figure 6:
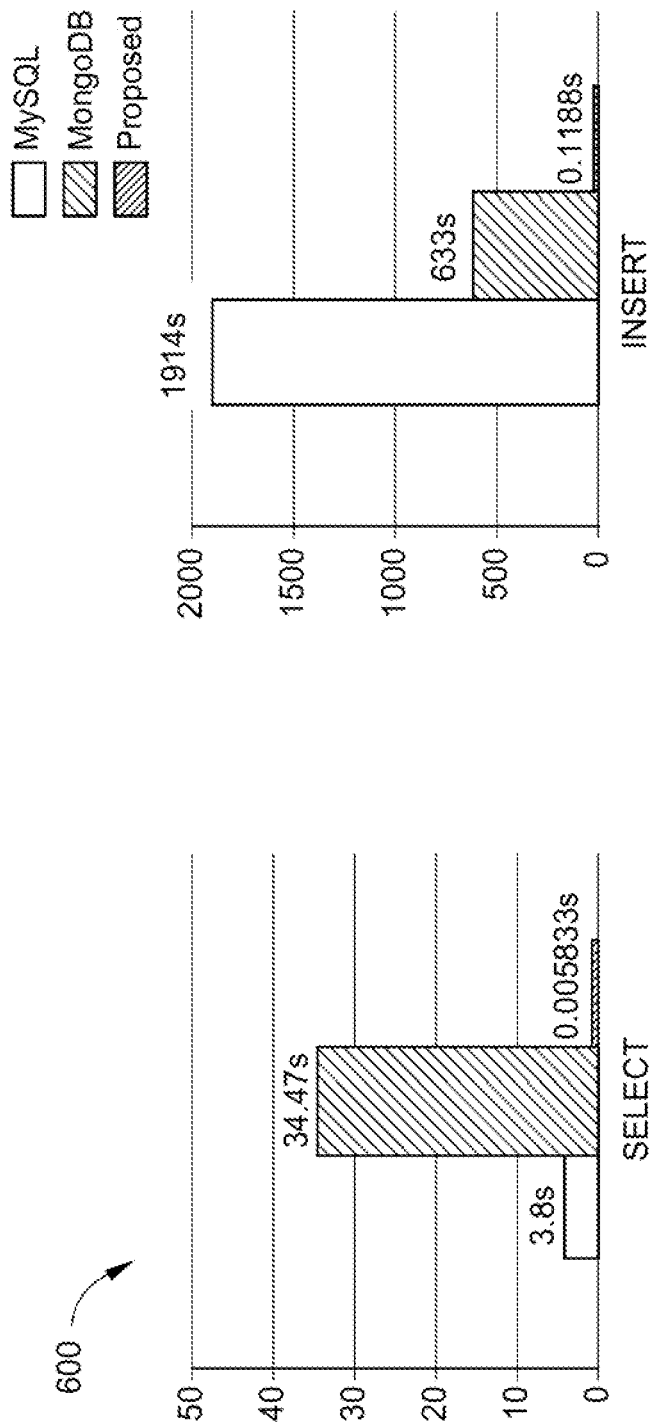
FIG. 6 illustrates the select and insert timing of various databases, according to disclosed embodiments.

FIG. 6 illustrates the select and insert timing of various databases, according to disclosed embodiments. Aspects of FIG. 4 are similar to the embodiments described herein. The databases shown in FIG. 6 are MySQL, MongoDB, and the proposed database structure utilizing the method 500 of FIG. 5. For a select database query command, the method 500 may have about a 0.005833 second completion time for a binary record size of 128 bytes after compression on 1,000,000 records. The method 500 completion time for the select database query command may be substantially faster than the select query command of the MySQL database and the MongoDB database. Likewise, the insert database query command utilizing the method 500 may have a completion time of about 0.1188 seconds. The method 500 completion time for the insert database query command may be substantially faster than the insert database query command of the MySQL database and the MongoDB database.

By utilizing a query compiler to compress database query commands and decompression codes into machine codes, the performance of the computational storage system and/or the data storage device may be improved.

In one embodiment, a data storage device is disclosed, comprising one or more memory devices, a controller coupled to the one or more memory devices and configured to execute a method for querying data. In embodiments, the method includes receiving a database query from a host, receiving compressed data from the one or more memory devices, decompressing the compressed data, the decompressing comprising filtering data during decompression based on the database query and returning a result of the filtering to the host.

The data storage device further includes receiving decompression code to decompress the compressed data. The decompression code is compiled to machine code. The query is compiled into the machine code. The data storage device further includes a plurality of processing cores, where the machine code is distributed to at least a portion of the plurality of processing cores. The data storage device further includes a plurality of front-end module (FM) ASICs, where the compressed data is distributed among each of the plurality of FM ASICs. The compressed data distributed among the plurality of FM ASICs is provided to the plurality of processing cores.

In another embodiment, a solid state data storage device is disclosed, that includes a front-end module (FM) ASIC coupled to an NVM die configured to store data, and a front-end (FE) ASIC comprising a controller and a plurality of processors, the controller configured to perform a method for querying data. In embodiments, the method includes receiving a query for data stored on the NVM die, and decompressing the data, comprising filtering the data during decompression based on the query.

The method further includes distributing copies of the machine code to the plurality of processors. The FM ASIC includes a plurality of FM ASICs, where each FM ASIC includes an NVM die configured to store data. The method further includes receiving data from each one of the plurality of FM ASICs. The method further includes distributing the data to the plurality of FM ASICs. The decompressing the data and filtering decompressed data based on the query is executed in parallel on each of the plurality of processors. The method further includes aggregating a result of the filtering and providing the result to a host. The data includes data organized into a table with a schema.

In another embodiment, a device for storing data is disclosed that includes one or more memory means, and a controller means configured to perform a method for querying data. In embodiments, the method includes receiving a database instruction from a host, receiving compressed data from the one or more memory means, and providing a result of the database instruction to the host.

The decompression code and database instruction are compiled to machine code, where the machine code is configured to decompress the data and filter the decompressed data based on the database instruction. The one or more memory means includes a plurality of memory means. The method further includes receiving data from a host, compressing the data, and distributing the compressed data among the plurality of memory means. The database instruction includes one of a select, an update, an insertion, and a deletion.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
one or more memory devices; and
a controller coupled to the one or more memory devices and configured to execute a method for querying data, the method comprising:
receiving a database query from a host;
receiving compressed data from the one or more memory devices;
receiving a decompression code from a front-end module (FM) ASIC;
compiling the database query and the decompression code to a machine code;
decompressing the compressed data using the machine code, the decompressing comprising filtering data during decompression based on the database query; and
returning a result of the filtering to the host.

2. The data storage device of claim 1, further comprising a plurality of processing cores, wherein the machine code is distributed to at least a portion of the plurality of processing cores.

3. A data storage device, comprising:
one or more memory devices;
a controller coupled to the one or more memory devices and configured to execute a method for querying data, the method comprising:
receiving a database query from a host;
receiving compressed data from the one or more memory devices;
decompressing the compressed data, the decompressing comprising filtering data during decompression based on the database query;
returning a result of the filtering to the host; and
receiving decompression code to decompress the compressed data, wherein the decompression code is compiled to machine code
a plurality of processing cores, wherein the machine code is distributed to at least a portion of the plurality of processing cores; and,
a plurality of front-end module (FM) ASICs, the compressed data being distributed among each of the plurality of FM ASICs.

4. The data storage device of claim 3, wherein the compressed data distributed among the plurality of FM ASICs is provided to the plurality of processing cores.

5. A solid state data storage device, comprising:
a front-end module (FM) ASIC coupled to an NVM die configured to store data; and
a front-end (FE) ASIC comprising a controller and a plurality of processors, the controller configured to perform a method for querying data, the method comprising:
receiving a query for data stored on the NVM die; and
decompressing the data, comprising filtering the data during decompression based on the query.

6. The solid state data storage device of claim 5, wherein the method further comprises:
receiving decompression code for the data; and
compiling the decompression code and query to machine code.

7. The solid state data storage device of claim 6, the method further comprising distributing copies of the machine code to the plurality of processors.

8. The solid state data storage device of claim 7, wherein the FM ASIC comprises a plurality of FM ASICs, each FM ASIC comprising an NVM die configured to store data, the method further comprising receiving data from each one of the plurality of FM ASICs.

9. The solid state data storage device of claim 8, the method further comprising distributing the data to the plurality of FM ASICs.

10. The solid state data storage device of claim 9, wherein decompressing the data and filtering decompressed data based on the query is executed in parallel on each of the plurality of processors.

11. The solid state data storage device of claim 10, wherein the method further comprises aggregating a result of the filtering, and providing the result to a host.

12. The solid state data storage device of claim 11, wherein the data comprises data organized into a table with a schema.

13. A device for storing data, comprising:
one or more memory means; and
a controller means configured to perform a method for querying data, the method comprising:
receiving a database instruction from a host;
receiving compressed data from the one or more memory means;
receiving a decompression code from a front-end module (FM) ASIC;
compiling a database query and the decompression code to a machine code;

decompressing the compressed data using the machine code, the decompressing comprising filtering data during decompression based on the database query; and providing a result of the database instruction to the host.

14. The device for storing data of claim 13, the method further comprising:

combining the decompression code with the database instruction.

15. The device for storing data of claim 13, wherein the one or more memory means comprises a plurality of memory means, and wherein the method further comprises receiving data from a host, compressing the data, and distributing the compressed data among the plurality of memory means.

16. The device for storing data of claim 15, wherein the database instruction comprises one of a select, an update, an insertion, and a deletion.

* * * * *